(12) United States Patent
Yen et al.

(10) Patent No.: US 7,327,367 B2
(45) Date of Patent: Feb. 5, 2008

(54) METHOD AND APPARATUS FOR FONT PROCESSING

(75) Inventors: Yvonne Yen, Taipai (TW); Jordan Yu, Taipai (TW)

(73) Assignee: Integrated Device Technology, Inc., San Jose, CA (US)

( * ) Notice: Subject to any disclaimer, the term of this patent is extended or adjusted under 35 U.S.C. 154(b) by 302 days.

(21) Appl. No.: 10/953,866

(22) Filed: Sep. 29, 2004
(Under 37 CFR 1.47)

(65) Prior Publication Data
US 2005/0177787 A1 Aug. 11, 2005

Related U.S. Application Data

(60) Provisional application No. 60/507,123, filed on Oct. 1, 2003.

(51) Int. Cl.
*G06F 17/00* (2006.01)
*G06T 11/00* (2006.01)

(52) U.S. Cl. .................................. 345/472; 715/519
(58) Field of Classification Search .................. None
See application file for complete search history.

(56) References Cited

U.S. PATENT DOCUMENTS

| | | | | |
|---|---|---|---|---|
| 4,907,282 | A * | 3/1990 | Daly et al. | 382/242 |
| 6,377,261 | B1 * | 4/2002 | Fernandez et al. | 345/467 |
| 6,538,653 | B1 * | 3/2003 | Katsura et al. | 345/472 |
| 6,697,070 | B1 * | 2/2004 | Katsura et al. | 345/469 |
| 6,771,391 | B1 * | 8/2004 | Konishi et al. | 358/1.9 |
| 2002/0008713 | A1* | 1/2002 | Toji et al. | 345/694 |
| 2002/0085006 | A1* | 7/2002 | Shade et al. | 345/471 |
| 2002/0093502 | A1* | 7/2002 | Koyama | 345/467 |
| 2003/0011603 | A1* | 1/2003 | Koyama et al. | 345/470 |

* cited by examiner

*Primary Examiner*—Kee M. Tung
*Assistant Examiner*—Michelle K Lay
(74) *Attorney, Agent, or Firm*—Akin Gump, et al.

(57) ABSTRACT

In one application, a method according to an embodiment of the invention is used to enable a display of proportionally spaced characters using a fixed-font display controller.

2 Claims, 9 Drawing Sheets

METHOD AND APPARATUS FOR FONT PROCESSING

CROSS-REFERENCE TO RELATED APPLICATIONS

This application claims the benefit of U.S. Provisional Application No. 60/507,123 filed Oct. 1, 2003, entitled "SYSTEM, METHOD, AND APPARATUS FOR FONT PROCESSING."

BACKGROUND OF THE INVENTION

1. Field of the Invention

This invention relates to display processing.

2. Background Information

Many consumer and industrial appliances include user interfaces that allow users to monitor and/or control their operation. An important part of such an interface is the on-screen display (OSD). Examples of appliances in the consumer market that may use OSD include video monitors, flat-panel displays, cellular telephones, personal digital assistants (PDAs), DVD and videotape players, and other appliances from wristwatches to sewing machines to refrigerators.

It is desirable to support the display of proportionally spaced characters in an OSD application.

BRIEF SUMMARY OF THE INVENTION

In one preferred embodiment of the present invention, display processing is performed by the following series of steps:

1. Receive a first set of character representations, wherein each first representation includes a single character representation and has a size of m in a first dimension and n in a second dimension.

2. Assemble more than one such character representation into an array of size less than 2 m in the first dimension and less than 2 n in the second dimension.

3. Output a second set of character representations, wherein each second representation has a size less than 2 m in the first dimension and less than 2 n in the second dimension, and at least one second representation includes at least portions of two different characters.

In another preferred embodiment of the present invention, an apparatus having storage and a processor is provided for performing the display processing.

DETAILED DESCRIPTION OF THE INVENTION

Embodiments of the invention include a method of receiving a first set of character representations, each first representation including a single character representation and having a size of m in a first dimension and n in a second dimension; assembling more than one such character into an array of size less than 2 m in the first dimension and less than 2 n in the second dimension; and outputting a second set of character representations, at least one second representation including at least portions of two different characters.

Although the description herein relates principally to characters, it will be understood that in most contexts, the description is not limited to alphanumeric characters but relates to other symbols as well (e.g. punctuation; musical or mathematical symbols; non-alphabetic characters of Chinese, Japanese, or other languages; etc.).

Figure 1:
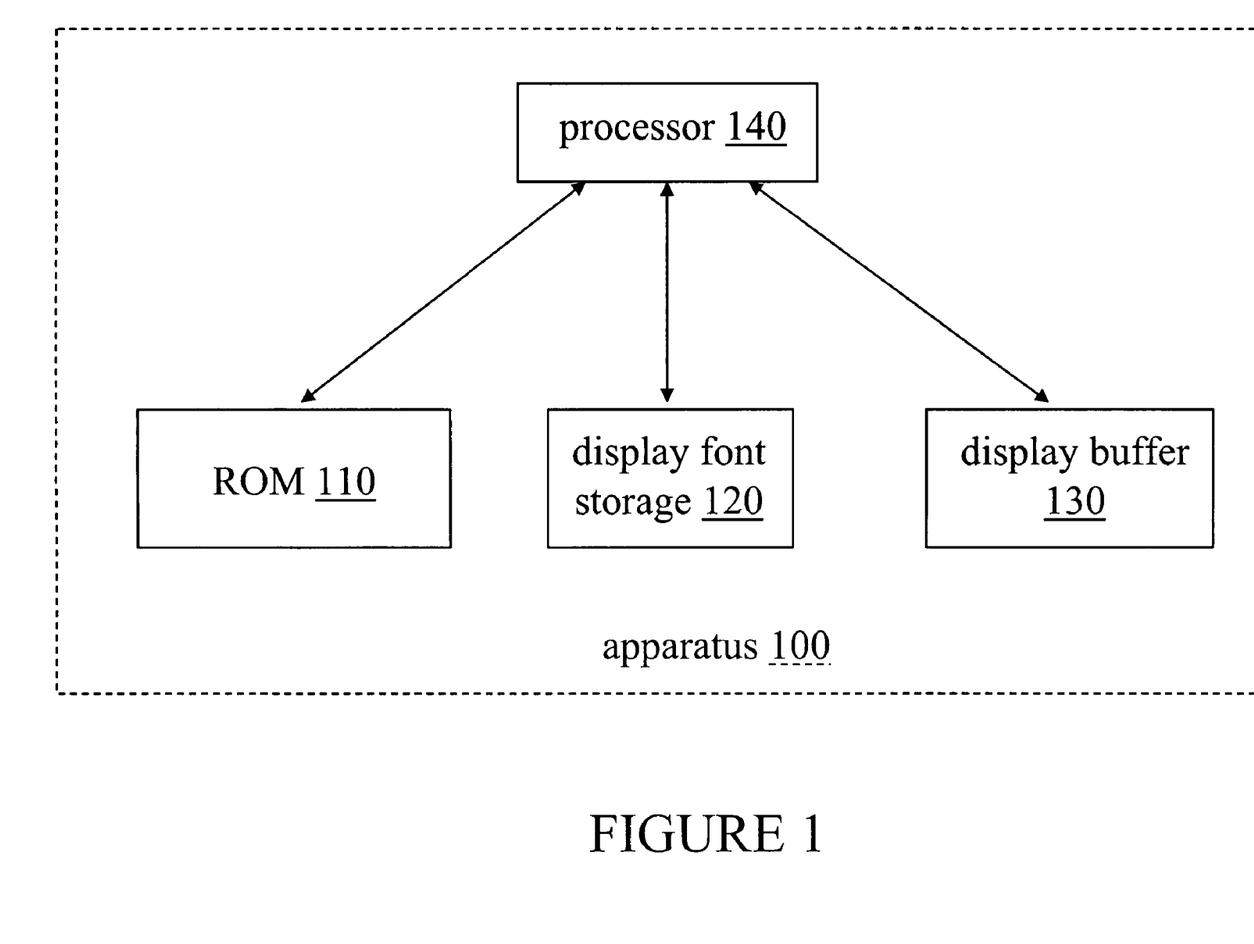
FIG. 1 is a block diagram of an apparatus 100 according to an embodiment of the invention.
Figure 2:
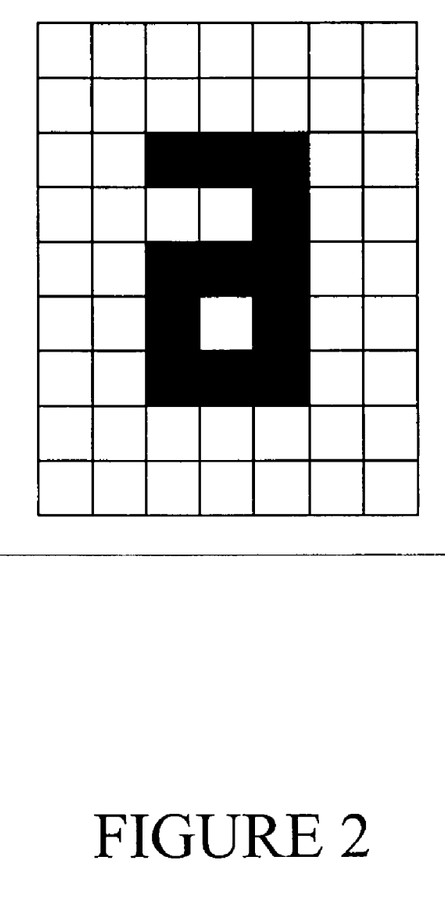
FIG. 2 shows a 7×9 matrix that represents the letter 'a'.

FIG. 1 shows a block diagram of an apparatus 100 according to one embodiment of the invention. Read-only memory (ROM) 110 stores data defining characteristics of a font. In one implementation, ROM 110 stores 256 character matrices, where each matrix contains a binary array (e.g. m×n bits, where m and n are nonzero positive integers) representing a bitmap of a different character or symbol. For example, FIG. 2 shows a 7×9 matrix that represents the letter 'a'. Each matrix may be of the same size (e.g. 4×6, 5×7, 10×12, 18×12, or larger), and ROM 110 may be configured such that each matrix can be selected based on the ASCII code corresponding to its character or symbol. In some applications (e.g. where reconfiguration may be desired), ROM 110 may be implemented using nonvolatile (e.g. flash) random-access memory (RAM).

In other implementations, ROM 110 may contain more (e.g. up to 512) or fewer (e.g. up to 32, up to 64, up to 128) matrices, e.g. depending upon on the desired character set. In one arrangement, ROM 110 may contain only matrices of a particular size m×n. Alternatively, ROM 110 may contain more than one set of character matrices relating to the same font description, with at least one set having different-sized matrices than another. As a further alternative, ROM 110 may contain more than one set of character matrices, with at least one set relating to a different font description than another.

In some implementations, ROM 110 may be at least partially compressed. For example, a character or symbol may be represented at least partially with one or more indices into an array of submatrices (e.g. representing quadrants or other subdivisions of the matrix) and/or character elements that may be common to more than one character (e.g. a long vertical bar may be a subelement common to the characters 'B', 'D', 'P', 'I', 'L', etc.). Alternatively, a character or symbol may be represented at least partially algorithmically or parametrically (e.g. using one or more splines such as cubic, Hermite, Bezier, or B-splines, etc.). As a further alternative, a matrix may be stored in ROM 110 using an encoding technique such as run-length encoding or a statistical encoding (e.g. Huffman coding).

Processor 140 receives information identifying a string of characters to be displayed, retrieves data defining the corresponding characters from ROM 110, and stores a representation of each identified character in display font storage 120. For example, processor 140 may receive a string of ASCII codes or other codes that may be used to identify particular symbols stored in ROM 110.

In another embodiment, processor 140 may simply retrieve data defining all of the characters represented in ROM 110 and store representations of all such characters in display font storage 120.

Retrieval and storage of the data by processor 140 may include resizing a character matrix or other representation to a different size. For example, characters may be retrieved from ROM 110 as 6×8 matrices (or e.g. parametric representations thereof) and stored in display font storage 120 as 12×18 matrices.

Retrieval and storage of the data by processor 140 may be performed on demand (e.g. in response to receiving information identifying a string of characters to be displayed) or, alternatively, as part of an initialization procedure (e.g. retrieving data defining all of the characters represented in ROM 110 and storing corresponding representations of all such characters in display font storage 120).

Alternatively, processor 140 may retrieve and store all of a limited set of strings or string portions available for display. For example, the interface may be configured to display only five different messages, each message including a fixed string and a variable numeric portion. In such an application, processor 140 may retrieve and store data corresponding to the fixed string portions e.g. during an initialization routine. For example, an initialization routine may be executed at some time between a moment of power-up and a moment when the device including an apparatus according to an embodiment of the invention is ready for general operation (e.g. ready to accept an external input signal). In such case, processor 140 may retrieve and store the variable string portions at run-time (e.g. on demand).

Figure 3:
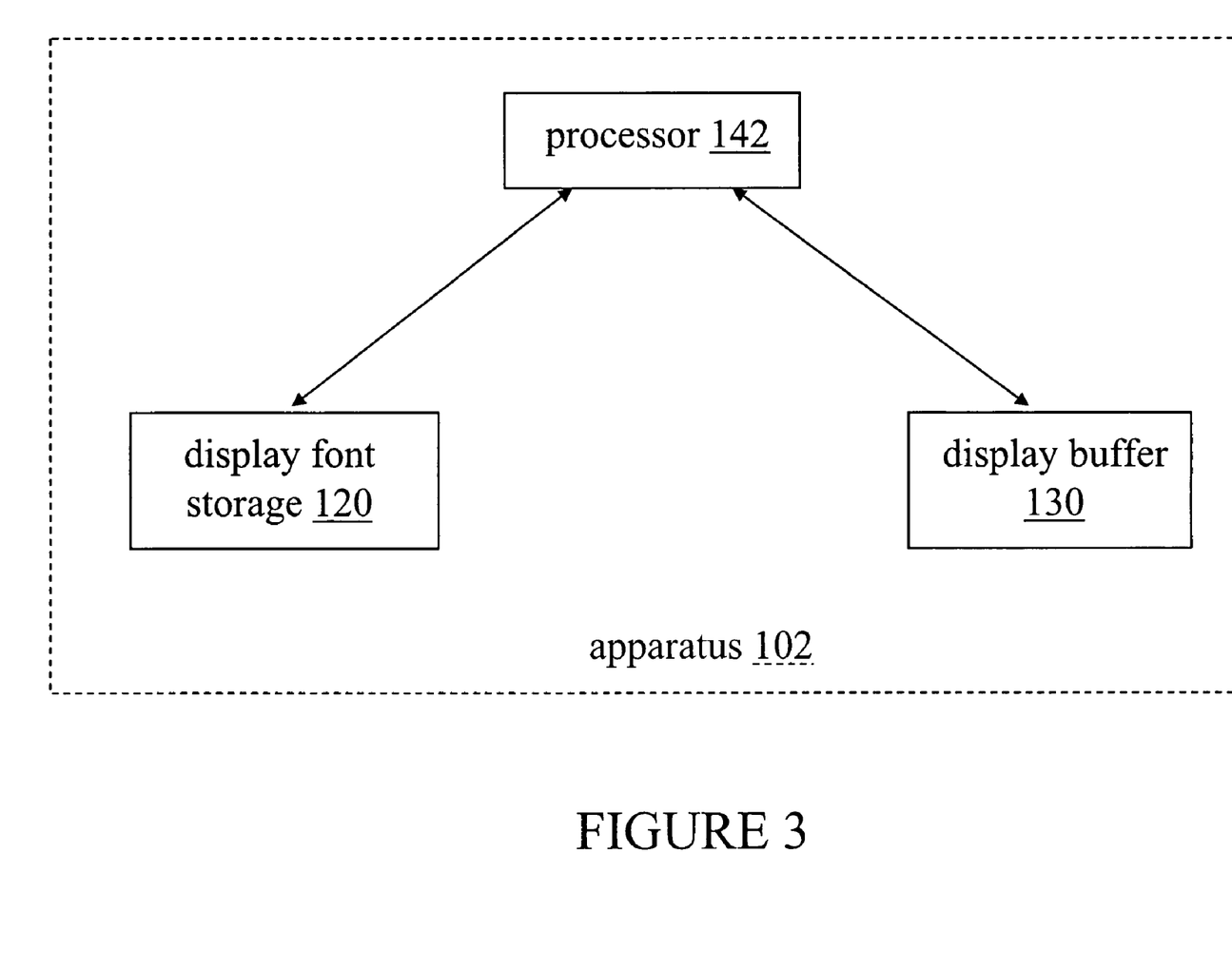
FIG. 3 is a block diagram of an implementation 102 of apparatus 100.

Display font storage 120 may be implemented as volatile RAM, nonvolatile RAM, or ROM. In an application where data is retrieved from ROM 110 on demand, for example, or in which resizing of character information from ROM 110 may be required during operation, it may be desirable to implement display font storage 120 using RAM (e.g. static or dynamic RAM). In an application where display font storage 120 stores representations of all available characters (e.g. all characters defined in ROM 110) or of all available strings or string portions, it may be desirable to implement display font storage 120 using nonvolatile RAM (e.g. in a situation where reprogrammability may be desired) or ROM (e.g. in a situation where reprogrammability is not necessary, or where reconfiguration by changing a socketed chip is acceptable). In the latter cases, it may be possible to dispense with ROM 110 and to practice embodiments of the invention without it, e.g. as in the implementation 102 of apparatus 100 shown in FIG. 3 (including implementation 142 of processor 140, which may be configured only to retrieve data from (i.e. not to store data to) display font storage 120).

Figure 4:
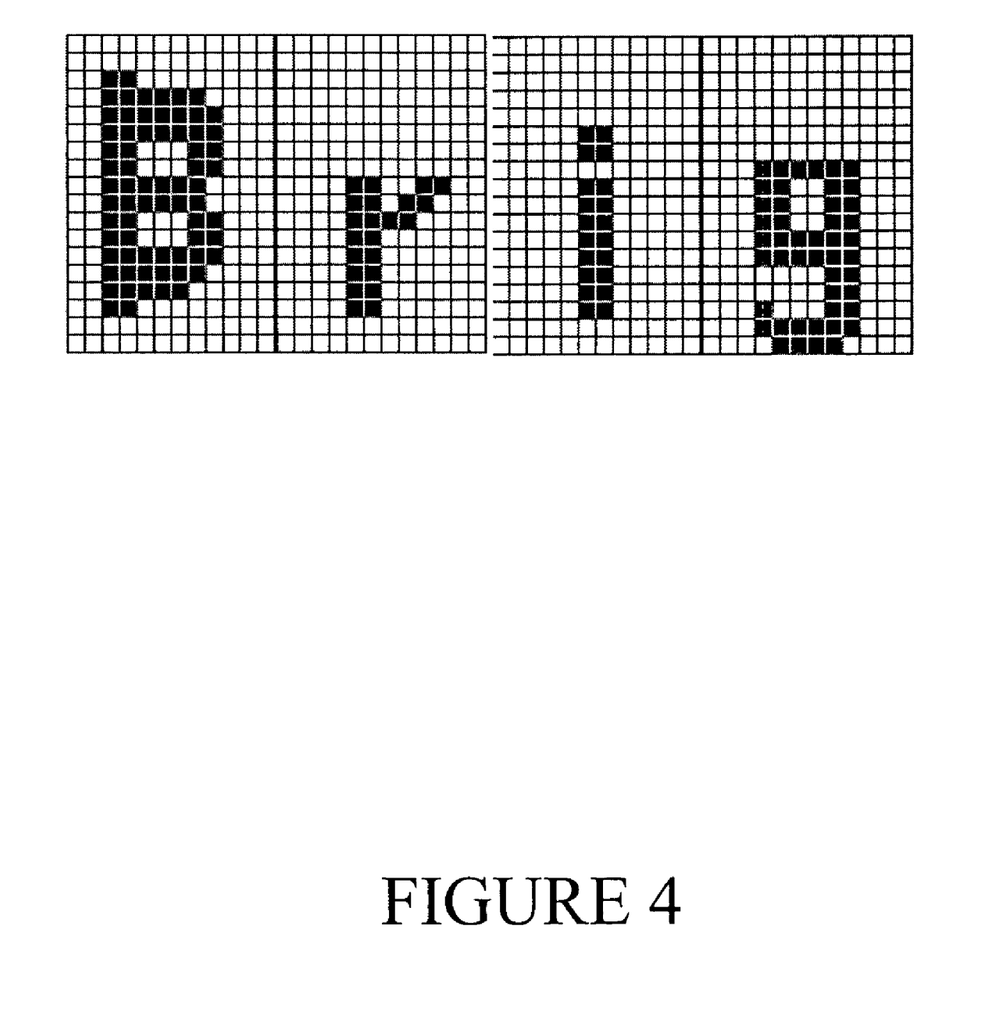
FIG. 4 shows one example of four character representations stored in display font storage 120.

FIG. 4 shows one example of four character representations stored in display font storage 120. In this example, each character is represented as a 12×18 binary matrix, where bits of one value indicate parts of the character, and bits of the other value indicate blank space. Although display font storage 120 stores character representations, such representations may be stored in an encoded form (e.g. using run-length or Huffman coding).

Processor 140 retrieves character representations from display font storage 120, resizes the character representations into blocks according to one or more sizing criteria and then assembles the representations within the blocks according to one or more spacing criteria, and stores the blocks into display buffer 130. In one preferred implementation, the sizing criteria is one in which the resized character blocks are less than twice the first dimension and less than twice the second dimension of the matrices of the character representations as they are stored in the display font storage 120. This implementation also includes a sizing criteria that retains the same matrix dimensions of the character representations as they are stored in display font storage 120 for use in the assembled representation blocks.

In one implementation, processor 140 determines the left-hand and right-hand boundaries of each character (e.g. the first and last columns that actually contain parts of the character, as opposed to blank space) and stores the characters according to a spacing criterion applied between these boundaries. This spacing criterion may be a fixed number of pixels, or a fixed proportion relative to the font width (or height, for vertical spacing).

Alternatively, the spacing criterion may be variable, e.g. depending on the left and/or right character or symbol. In one example, the spacing criterion is taken from a table that is indexed on one dimension by the shape (e.g. vertical bar, concave curve, convex curve) of the character portion to the left of the space and on the other dimension by the shape of the character portion to the right of the space (e.g. as shown in FIG. 12 of U.S. Pat. No. 4,907,282 and as discussed in that document at col. 14, 1.50 to col. 15, 1.35). In another example, the spacing criterion is taken from a vector indexed by the identity or shape of one of the left and right character or symbol.

A spacing criterion may be negative (e.g. as may be desired in the case of 'Wa'). The spacing criteria may also include adjustments between letters that are known as 'kerning' in the art of typography. In some applications, the spacing criteria may be stored as part of the font definition (e.g. in ROM 110). In such cases, the spacing criteria may be processed (e.g. scaled) by processor 140 as appropriate and stored in display font storage 120 for retrieval with the corresponding character representations. In a preferred implementation, the spacing criteria between character representations is fixed so that at least one assembled representation includes at least portions of two different character representations retrieved from the ROM 110 or the display font storage 120.

Figure 5:
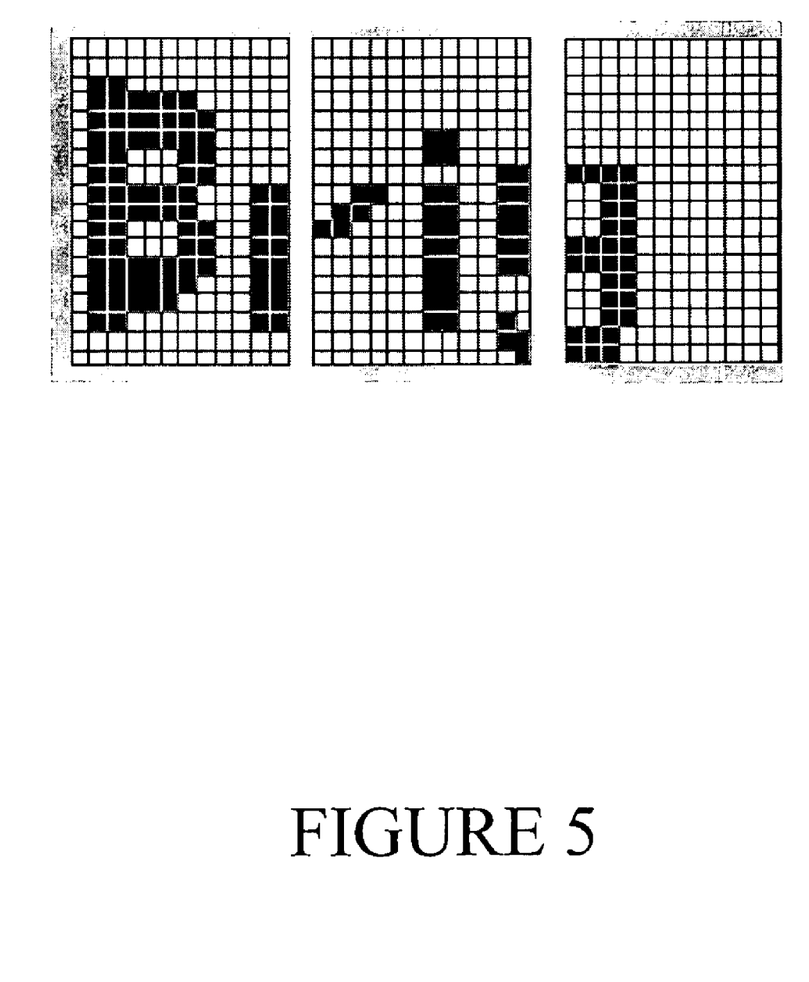
FIG. 5 shows one example of the four characters of FIG. 4 stored in display buffer 130 as three 12×18 blocks.

FIG. 5 shows one example of the four characters of FIG. 4 stored in display buffer 130 as three 12×18 blocks. In this implementation, the assembled representation blocks have the same dimensions as the matrices of the character representations that were retrieved from display font storage 120, thus the assembled representations have a size less than twice the first dimension and less than twice the second dimension of the matrices of the character representations that were retrieved from display font storage 120. Also in this example, a fixed spacing parameter of two pixels is applied between adjacent symbols. Thus there is at least one assembled representation that includes at least portions of two different character representations retrieved from display front 120 as the first assembled representation includes the character "B" and a portion of the character "r" and also the second assembled representation includes a portion of the character "r", the character "i" and a portion of the character "g". Although display buffer 130 stores block representations, such as representations may also be stored in an encoded form (e.g. using run-length or Huffman coding).

Display buffer 130 may be implemented as RAM (e.g. static, dynamic, or dual-port). Display buffer 130 may be configured to store representations of more than one string, such that a representation of a desired string may be retrieved according to a starting address and an ending address (or a starting address and a known length). Alternatively, display buffer 130 may be configured to store only one string representation, such that each representation stored overwrites the previously stored one, and the same address is used to access each representation.

In a further alternative, display buffer 130 may be implemented to store only a portion of a string representation. For example, display buffer 130 may serve to buffer each character block until another process transfers the block into a frame buffer. In one such case, display buffer 130 stores two character blocks, one block being written by processor 140 while the other is transferred into the frame buffer. In yet another alternative, display buffer 130 is a portion of a frame buffer, to which processor 140 writes directly.

Figure 6:
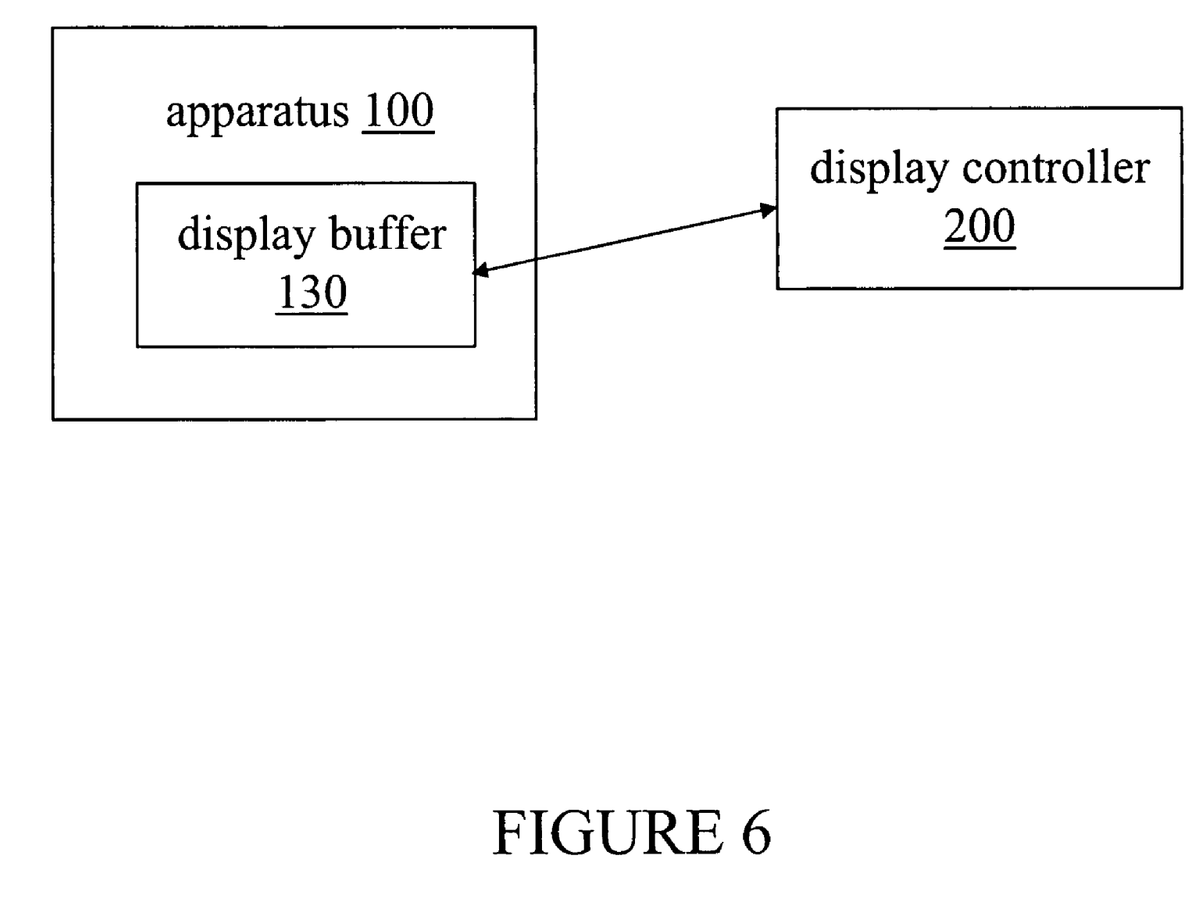
FIG. 6 shows a block diagram of a display device including apparatus 100 and display controller 200.

As shown in FIG. 6, an apparatus according to an embodiment of the invention may be deployed within a device that includes a display controller 200 (or the apparatus itself may include such a controller). Alternatively, a method according to an embodiment of the invention may be used within such a device (or the method itself may include operations of such a controller). Display controller 200 accepts blocks (e.g. pixel blocks) of a fixed size (e.g. 12×18 or some other size) as input, and outputs a corresponding signal for display to a user (e.g. on a cathode-ray tube (CRT), a projection display apparatus, or a liquid-crystal display (LCD) panel or other flat display panel (e.g. plasma or field-emission discharge)).

Figure 7:
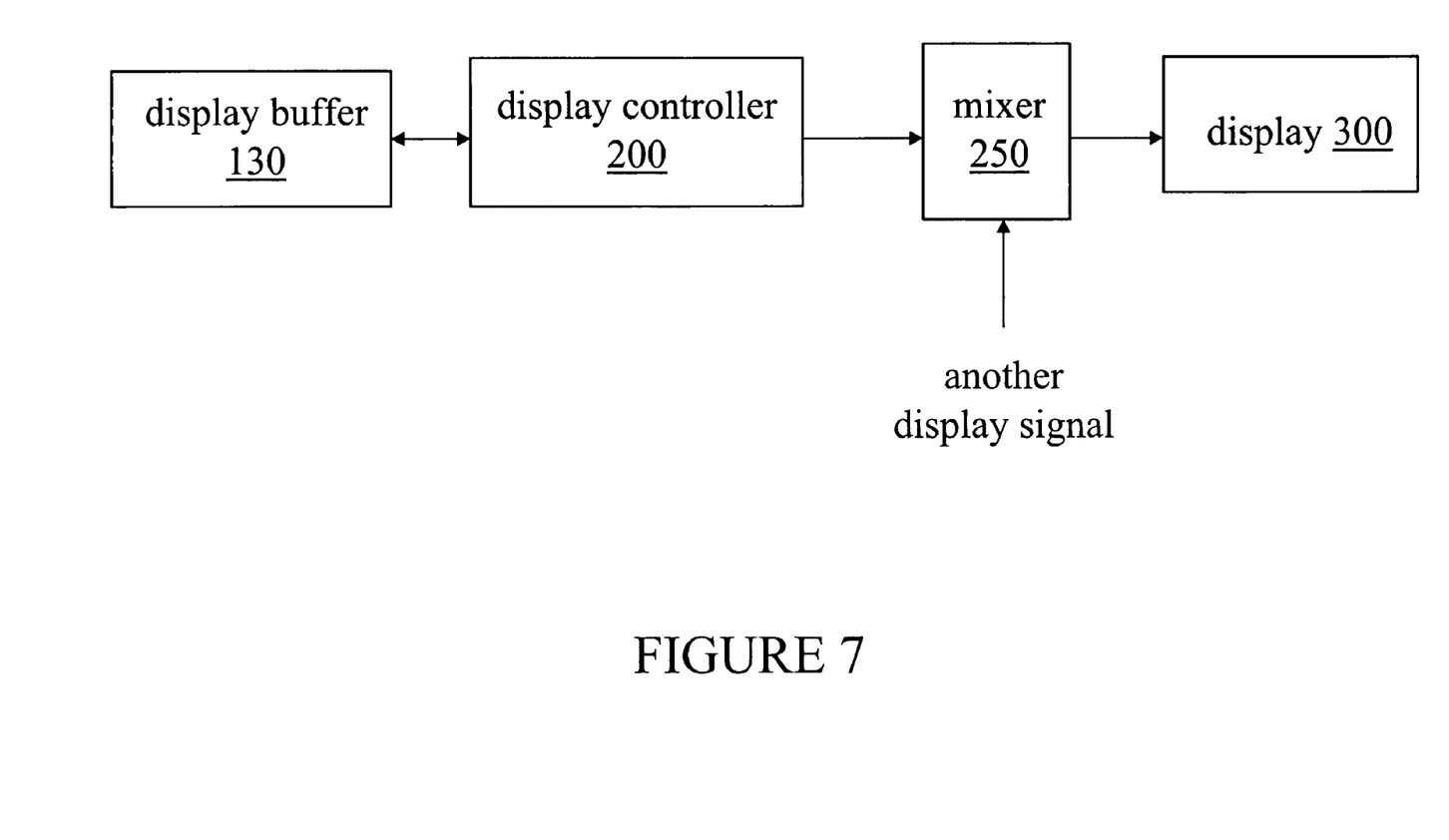
FIG. 7 shows a signal path including display buffer 130, a display controller 200, a mixer 250, and a display 300.
Figure 8:
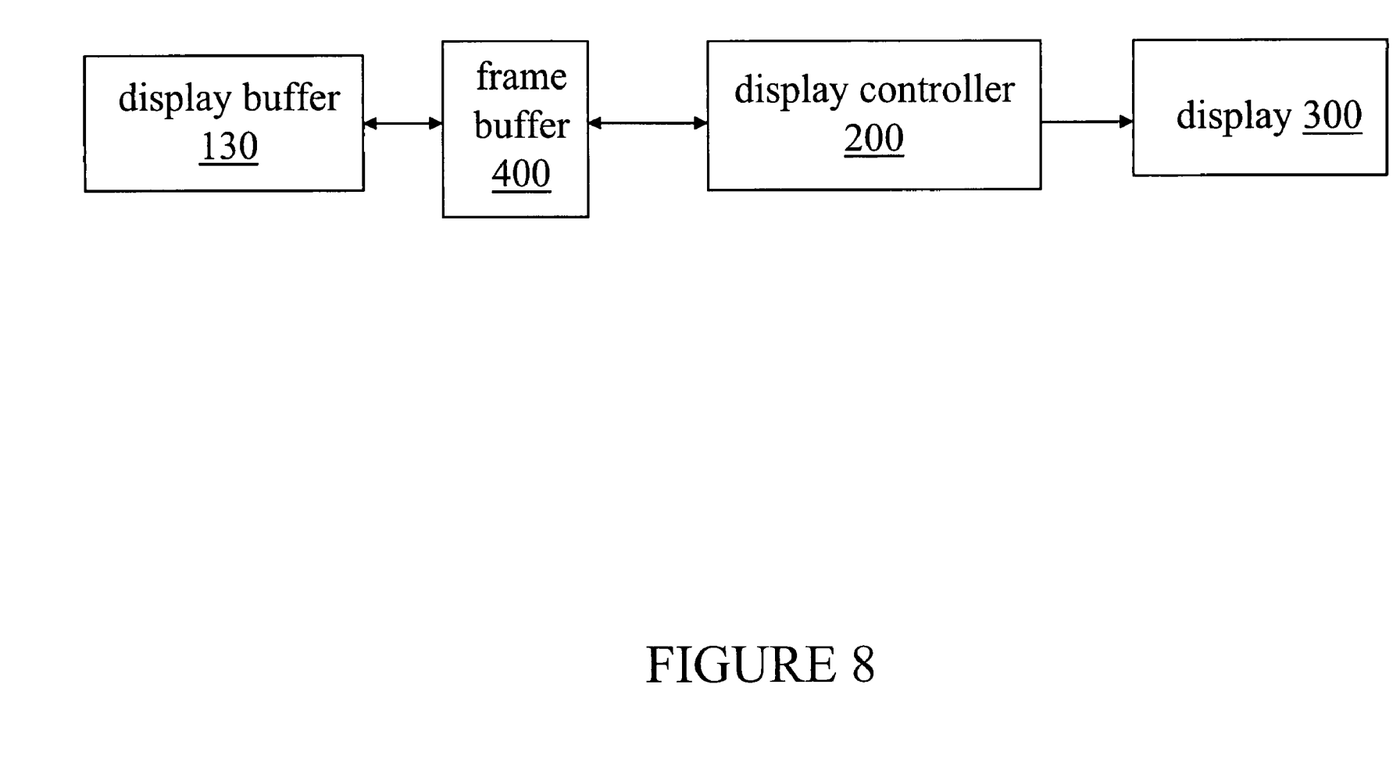
FIG. 8 shows a signal path including display buffer 130, a frame buffer 400, a display controller 200, and a display 300.

Display controller 200 may apply attributes or other effects to the blocks, such as bold, underline, italic, shadowing, shading, blinking, colors, and/or transparency. Display controller 200 may process only OSD data (e.g. to be mixed with another display signal by a mixer 250 or other display controller, as shown in FIG. 7), or it may produce a display signal for the entire display frame that includes OSD data. For example, such a controller may convert pixel blocks (and possibly other information) into RGB signals, and may generate synchronization (H and V) and other signals (e.g. blanking for a CRT) suitable for operating the display. In such a case, the display controller may also access a frame buffer for information relating to portions of the display frame underlying or apart from an area for display of OSD data. In one such arrangement, blocks from display buffer 130 are written into appropriate areas of frame buffer 400 (e.g. by processor 140 or display controller 200) as shown in FIG. 8.

Figure 9:
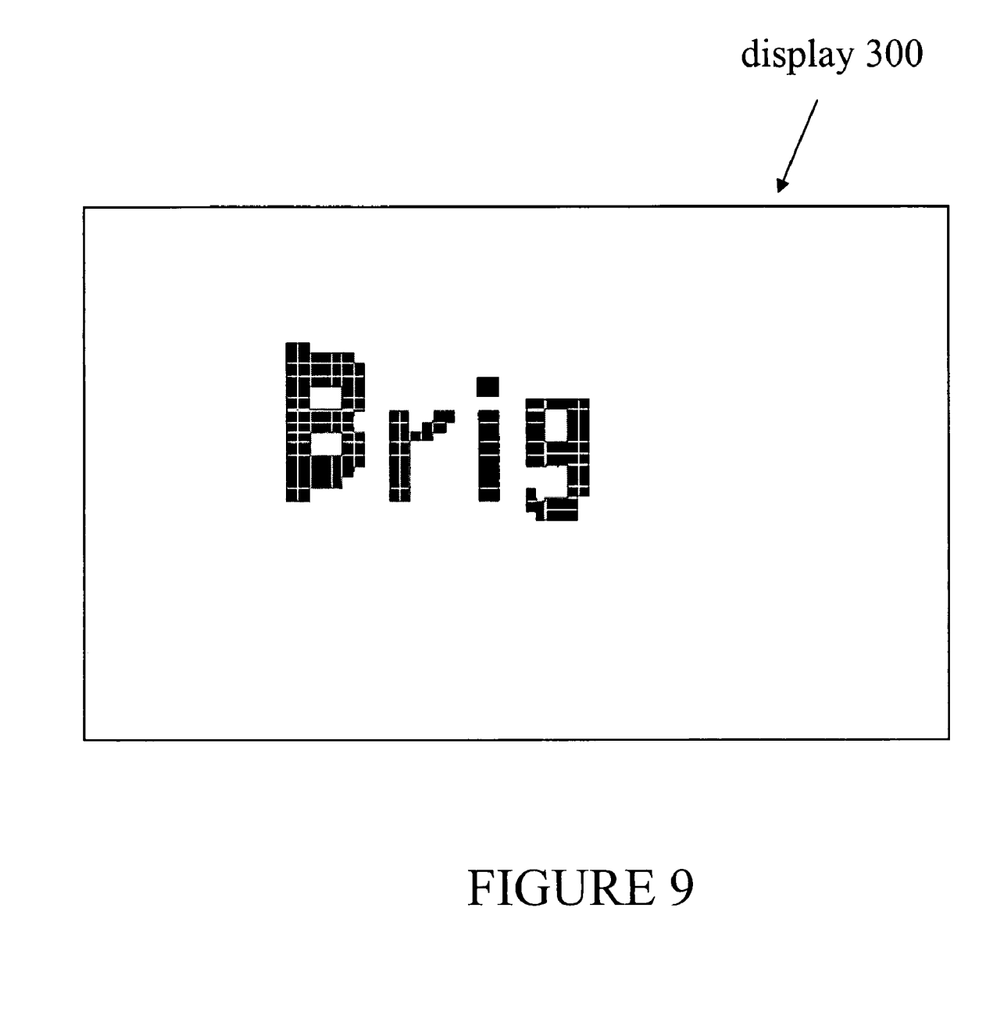
FIG. 9 shows a presentation of a string representation as stored in (or transferred through) display buffer 130 on a display 300.

It may be desirable to maintain a relatively small size of display buffer 130, but also to display such representations legibly. FIG. 9 shows one example of a frame that includes OSD data as may be displayed on a display 300. In this illustration, it may be understood that while a block of a string representation as stored in display buffer 130 may have a size e.g. m×n, a corresponding block of the display frame may have more than m×n pixels. For example, display 300 may support a frame of 1024×768 pixels (or 1280×1024, or 1600×1200, etc.), and each pixel of the representation as stored in display buffer 130 may correspond to a block (e.g. 10×10, 10×12) of pixels of a frame of display 300. Therefore, display controller 200 may produce a signal that expands each pixel of a block from display buffer 130 into a block of pixels of display 300, or a block from display buffer 130 may be expanded during the transfer to the frame buffer, or such expansion of the OSD representation for display may be achieved in a similar fashion.

The foregoing presentation of the described embodiments is provided to enable any person skilled in the art to make or use the present invention. Various modifications to these embodiments are possible, and the generic principles presented herein may be applied to other embodiments as well. For example, although spacing between symbols in a horizontal direction is discussed, the principles of the invention may also be applied to assemble symbols into blocks according to one or more vertical spacing criteria.

The invention may be implemented in part or in whole as a hard-wired circuit, as a circuit configuration fabricated into an application-specific integrated circuit, or as a firmware program loaded into non-volatile storage or a software program loaded from or into a data storage medium (e.g. ROM, RAM, CD-ROM or other optical media, hard disk or other magnetic media) as machine-readable code, such code being instructions executable by an array of logic elements such as a microprocessor or other digital signal processing unit.

In some applications, ROM 110 and processor 140 may be implemented on the same chip, or ROM 110 may be implemented within processor 140. In other applications, ROM 110 and processor 140 may be implemented as separate chips and/or in separate packages. ROM 110 (or display font storage 120, display buffer 130, or processor 140) itself may be implemented as separate chips and/or in separate packages. It is also possible for display font storage 120 and display buffer 130 to be implemented in the same chip or package, or for one or both to be implemented within processor 140.

In a further embodiment, processor 140 may apply one or more spacing criteria to the representations before storing them in display font storage 120. Thus, the present invention is not intended to be limited to the embodiments shown above but rather is to be accorded the widest scope consistent with the principles and novel features disclosed in any fashion herein.

What is claimed is:

1. A method for display processing, said method comprising:
   receiving a first set of character representations, each first representation including a single character representation and having a size of m in a first dimension and n in a second dimension;
   outputting a second set of character representations based on the first set, each second representation having a size less than 2 m in the first dimension and less than 2 n in the second dimension, and at least one second representation including at least portions of two different characters of the first set.

2. An apparatus for display processing, said apparatus comprising:
   a first storage;
   a processor configured to receive a first set of character representations from the first storage, each first representation including a single character representation and having a size of m in a first dimension and n in a second dimension; and
   a second storage,
   wherein the processor is further configured to output a second set of character representations based on the first set, each second representation having a size less than 2 m in the first dimension and less than 2 n in the second dimension, and at least one second representation including at least portions of two different characters of the first set.

* * * * *